(12) United States Patent
Kumar et al.

(10) Patent No.: US 9,461,555 B2
(45) Date of Patent: Oct. 4, 2016

(54) HVDC SERIES CURRENT SOURCE CONVERTER

(71) Applicant: ABB TECHNOLOGY LTD, Zürich (CH)

(72) Inventors: Amit Kumar, Chennai (IN); Subhasish Mukherjee, Ludvika (SE)

(73) Assignee: ABB TECHNOLOGY LTD, Zürich (CH)

( * ) Notice: Subject to any disclaimer, the term of this patent is extended or adjusted under 35 U.S.C. 154(b) by 0 days.

(21) Appl. No.: 14/915,343

(22) PCT Filed: Sep. 3, 2013

(86) PCT No.: PCT/EP2013/068165
§ 371 (c)(1),
(2) Date: Feb. 29, 2016

(87) PCT Pub. No.: WO2015/032421
PCT Pub. Date: Mar. 12, 2015

(65) Prior Publication Data
US 2016/0211761 A1 Jul. 21, 2016

(51) Int. Cl.
*H02J 3/36* (2006.01)
*H02M 5/45* (2006.01)
*H02M 5/44* (2006.01)

(52) U.S. Cl.
CPC ............. *H02M 5/45* (2013.01); *H02M 5/44* (2013.01)

(58) Field of Classification Search
CPC ............. H02J 3/36; H02J 1/08; H02M 5/44; H02M 5/45; H02M 5/458; H02M 7/483; Y02E 60/60

USPC .................. 363/15, 35, 37, 41, 51, 54
See application file for complete search history.

(56) References Cited

FOREIGN PATENT DOCUMENTS

| DE | 1 513 827 | 9/1969 |
| WO | WO 95/15605 A1 | 6/1995 |
| WO | WO 2012/037964 A1 | 3/2012 |
| WO | WO 2012/037966 A1 | 3/2012 |

OTHER PUBLICATIONS

Bahrman et al., "Integration of Small Taps into (Existing) HVDC Links", IEEE Transactions on Power Delivery, Jul. 1, 1995, vol. 10, No. 3, XP000557367, pp. 1699-1706.

Liang et al., "Current Source Modular Multilevel Converter for HVDC and FACTS", 2013 15th European Conference on Power Electronics and Applications (EPE), IEEE, Sep. 2, 2013, XP032505583, pp. 1-10.

(Continued)

*Primary Examiner* — Yemane Mehari
(74) *Attorney, Agent, or Firm* — Birch, Stewart, Kolasch & Birch, LLP

(57) ABSTRACT

A multilevel current source converter (CSC) for controlling electrical power transmission in a high voltage direct current (HVDC) transmission system includes an alternating current (AC) side for input/output of AC to/from the CSC; a direct current (DC) side for input/output of DC to/from the CSC; and a plurality of modular CSC cells connected in parallel with each other between the AC side and the DC side of the CSC, each modular cell comprising a plurality of switches. The CSC is configured for being connected in series with an HVDC transmission line and for injecting a voltage in series with the HVDC transmission line at the DC side of the CSC.

20 Claims, 4 Drawing Sheets

(56) References Cited

OTHER PUBLICATIONS

Liu et al., "Multi-Level Current Reinjection CSC for STATCOM Application", International Conference on Power System Technology, Oct. 1, 2006, pp. 1-5, XP031053343, paragraph [Section I and II], figure 1.

Liu et al., "Reinjection concept: a new option for large power and high-quality AC-DC conversion", IET Power Electronics, Mar. 6, 2008, vol. 1, No. 1, pp. 4-13, XP006030691, paragraph [Section I and III], figures 6, 8.

Murray et al., "Four Quadrant Multilevel Current Source Power Conditioning for Superconductive Magnetic Energy Storage", Power Engineering Conference, Sep. 27, 2009, pp. 1-5, XP031582535, paragraph [section IIA].

US 9,461,555 B2

HVDC SERIES CURRENT SOURCE CONVERTER

TECHNICAL FIELD

The present disclosure relates to a series connected converter in a high voltage direct current (HVDC) power transmission system.

BACKGROUND

An HVDC power transmission network (also called an HVDC power distribution system or meshed HVDC grid) uses direct current (DC) for the transmission of electrical power, in contrast to the more common alternating current (AC) systems. For long-distance transmission, HVDC systems may be less expensive and may suffer lower electrical losses. In general, an HVDC power transmission system comprises at least one long-distance HVDC link or cable for carrying direct current a long distance, e.g. under sea, and converter stations for converting alternating current to direct current for input to the HVDC power transmission system and converter stations for converting direct current back to alternating current.

In an meshed or, highly meshed HVDC grid, the DC node voltage might not be sufficient to control load flow congestion. A series connected converter may alleviate this problem by adding a fictitious resistance in the line. If the injected series voltage is $V_{AB}$, to ensure that the cable current is $I_{dc}$, a fictitious series resistance $R_{inj}=V_{AB}/I_{dc}$ is injected. Insertion of the series converter in a congested HVDC network is shown in FIG. 1 where a series converter is connected between A and B.

In a voltage source converter (VSC) based DC grid, the current direction changes based on the direction of power flow. Hence, for complete control of load flow, the series converter works in all the four quadrants as illustrated in FIG. 2.

The AC-DC converters in FIG. 1 represent DC Grid converter stations typically with asymmetrical monopoles with separate converter for positive and negative polarity, or they can be balanced bipolar converters. Both of the converter topologies are shown in FIG. 3. In FIG. 3, for both of the converter types the series converter location is shown. For symmetric voltage profile in the positive and negative lines a series converter (shown as SC in FIG. 3) is positioned in both positive and negative lines as shown in FIG. 3. The aim is to change the load sharing between the two cables x and y (both are positive lines) or, between the two cables z and q (both are negative lines) which is achieved by the series converter.

The series converter can be a voltage source converter (VSC). However, the harmonic content of the series injected voltage must be within permissible limits. In case the series converter is powered from an AC source (local AC grid, transformer tertiary winding) the power quality also has to be maintained at the AC side, such that the AC source is not polluted due to the series converter. These conditions may necessitate filters both in the DC and the AC side of the series converter.

Since the converter is connected in series with the HVDC line, rated current can flow through it, although the voltage produced by the converter is relatively small. Multi-level voltage source converters can reduce the voltage across each of the switching device which forms the converter, but rated line current still flows through them.

The protection of the converter is also an important criterion. VSCs are naturally vulnerable to DC side faults (faults on the HVDC cable). This necessitates requirement of fast and costly protection equipment so as to bypass the series converter efficiently at the event of a fault. Additional reactors might also be required in the main HVDC line to limit cable discharge current through the series converter at the time of the fault (pole-ground/pole-pole). These reactors need to be designed for rated current, thereby significantly adding to the cost of the overall solution.

Series converters of different known designs are described in WO 2012/037966, WO 2012/037964 and DE 1513827.

SUMMARY

In view of the background discussed above, the inventors have developed an improved HVDC series converter.

According to an aspect of the present invention, there is provided a multilevel current source converter (CSC) for controlling electrical power transmission in a high voltage direct current (HVDC) transmission system. The CSC comprises an alternating current (AC) side for input/output of AC to/from the CSC; a direct current (DC) side (21) for input/output of DC to/from the CSC; and a plurality of modular CSC cells connected in parallel with each other between the AC side and the DC side of the CSC, each modular cell comprising a plurality of switches. The CSC is configured for being connected in series with an HVDC transmission line and for injecting a voltage in series with the HVDC transmission line at the DC side of the CSC. It is noted that whether AC is inputted or outputted and DC is inputted or outputted depends on the direction of the current/voltage over the CSC, i.e. on whether the series injected voltage is positive or negative.

According to another aspect of the present invention, there is provided an HVDC power transmission system comprising at least one HVDC transmission line extending between two AC to DC converter stations. The HVDC power transmission system further comprises a multilevel CSC for controlling electrical power transmission in the HVDC transmission line. The CSC comprises an AC side connected to an AC supply for input/output of AC to/from the CSC; a DC side connected to the HVDC transmission line for input/output of DC to/from the CSC; and a plurality of modular CSC cells connected in parallel with each other between the AC side and the DC side of the CSC, each modular cell comprising a plurality of switches. The CSC is connected in series with the HVDC transmission line for injecting a voltage in series with the HVDC transmission line at the DC side of the CSC.

According to another aspect of the present invention, there is provided a method for controlling electrical power transmission in an HVDC transmission line in an HVDC transmission system. The method comprises providing a CSC. The CSC comprises an AC side for input/output of AC to/from the CSC; a DC side for input/output of DC to/from the CSC; and a plurality of modular CSC cells connected in parallel with each other between the AC side and the DC side of the CSC, each modular cell comprising a plurality of switches. The method also comprises connecting the CSC in series with the HVDC transmission line; and injecting a positive voltage from the CSC in series with the HVDC transmission line to reduce current flow in the line, and/or injecting a negative voltage from the CSC in series with the HVDC transmission line to increase current flow in the line.

By using a CSC in the series converter, in accordance with the present invention, the need for using filters for handling harmonics introduced with a VSC is reduced or obviated. Also, by using a plurality of CSC cells connected in parallel, the need for filters is additionally reduced. Components with a lower current rating may be used in the CSC cells since they are connected in parallel, reducing production cost of the series converter. The series injected voltage may be positive and/or negative, and is injected to control the current in the HVDC transmission line.

In some embodiments, the CSC comprises a thyristor diverter comprising a plurality of thyristors at the DC side of the CSC and connected to the plurality of modular CSC cells, configured to allow the CSC to inject the current in series with the HVDC transmission line regardless of in which direction a current flows in said HVDC transmission line.

In some embodiments, the plurality of switches comprised in the modular CSC cells have bi-directional voltage blocking and unidirectional current conducting properties.

In some other embodiments, the plurality of switches have bi-directional voltage blocking and bi-directional current conducting properties.

In some other embodiments, the CSC comprises an anti-parallel CSC part connected in parallel with a first CSC part comprising the plurality of modular CSC cells, which anti-parallel CSC part is configured to conduct current in a direction opposite to a direction which the plurality of modular CSC cells are configured to conduct in.

In some embodiments, the plurality of switches each comprises a forced commutated thyristor, an insulated-gate bipolar transistor (IGBT) with series diode, a reverse blocking integrated gate-commutated thyristor (IGCT), or a reverse blocking IGBT (RBIGBT).

In some embodiments, the AC side is configured for input of three phase AC, and each modular CSC cell comprises six switch positions, two per AC phase.

In some other embodiments, the AC side is configured for input of single phase AC, and each modular CSC cell comprises four switch positions. In some embodiments, the CSC comprises three CSC parts configured to be connected in parallel or in series with each other, each of the three CSC parts being configured for single phase AC input, to form a CSC with three single phase CSC parts in parallel or series with each other, one for each phase of a three phase AC supply.

In some other embodiments, each modular CSC cell comprises a reactor upstream of the plurality of switches and a reactor downstream of the plurality of switches.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
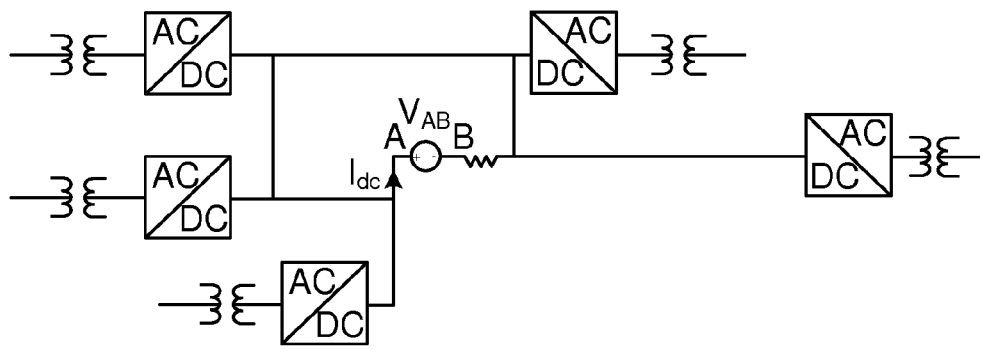
FIG. 1 is a schematic block diagram of an embodiment of an HVDC power transmission network.
Figure 2:
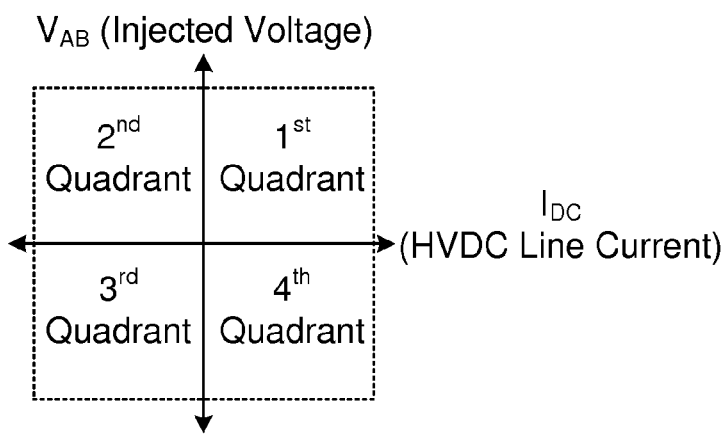
FIG. 2 schematically illustrates the four different quadrants discussed herein.
Figure 3:
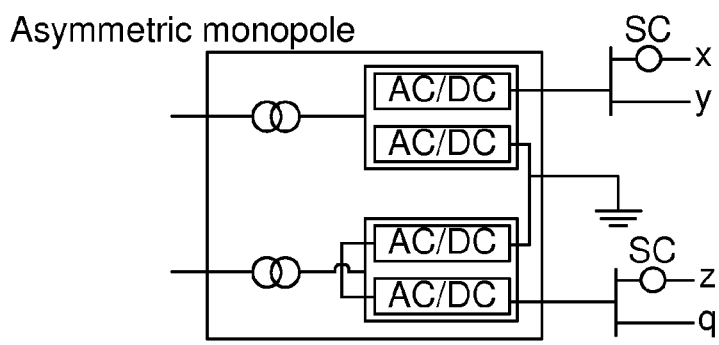
FIG. 3 is a schematic block diagram explaining a difference between an asymmetric monopole and a symmetric monopole HVDC converter station.
Figure 3:
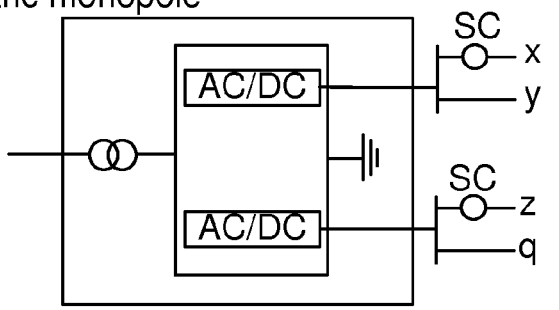
Figure 4:
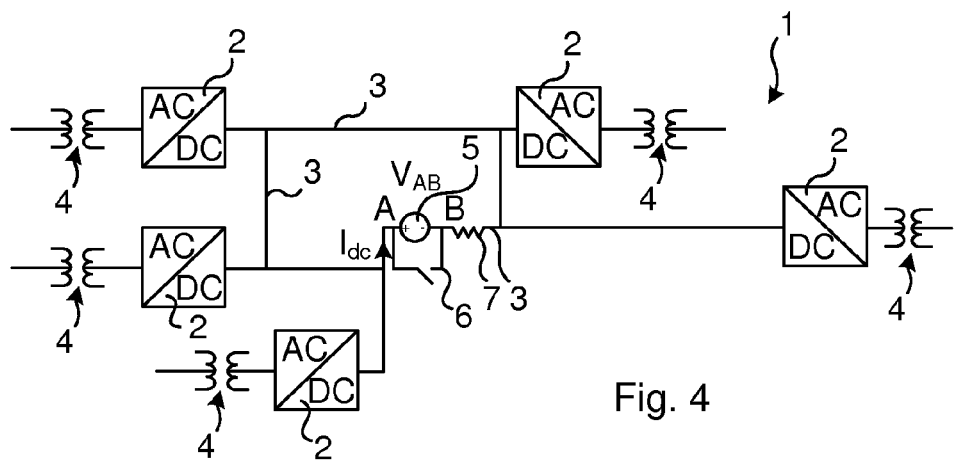
FIG. 4 is a schematic block diagram of an embodiment of an HVDC power transmission system in accordance with the present invention.

FIG. 4 is a schematic block diagram of an embodiment of an HVDC power transmission system 1 in accordance with the present invention. The HVDC system 1 comprises a plurality of AC to DC converter stations 2. The converter stations are configured to transform AC current e.g. from a public AC grid into DC current in the HVDC system 1. Of course, the inputted AC power may be either positive or negative, depending on the direction of the DC current from any of the converter stations 2, why the converter stations may just as well be called DC to AC converter stations 2. Typically, positive AC power is inputted at some of the converter stations and outputted at some other, and whether positive AC power is inputted or outputted at any one converter station may change over time depending on the operation of the HVDC system 1. Between two converter stations 2, a HVDC transmission line 3 runs for carrying HVDC current there between. If the HVDC system is a grid as shown in FIG. 4, a plurality of HVDC lines 3 connect more than two converter stations 2. Associated with each converter station 2, there may be a transformer 4, between the converter station 2 and the AC supply (e.g. public grid). FIG. 4 shows a series converter 5, a CSC in accordance with the present invention, connected in series with (also called in-line with) one of the transmission lines 3 between the points A and B on the transmission line. There is also a bypass switch 6 arranged to, when in a closed position, bypass the series converter 5, e.g. when the series converter is being serviced or not needed. The series converter 5 may be used to control the current in the transmission line 3 with which it is connected in series with e.g. to prevent/alleviate flow congestion in the transmission line. The DC line resistance 7 is schematically shown in series with the series converter 5 and the transmission line 3, which gives the line resistance.

Figure 5:
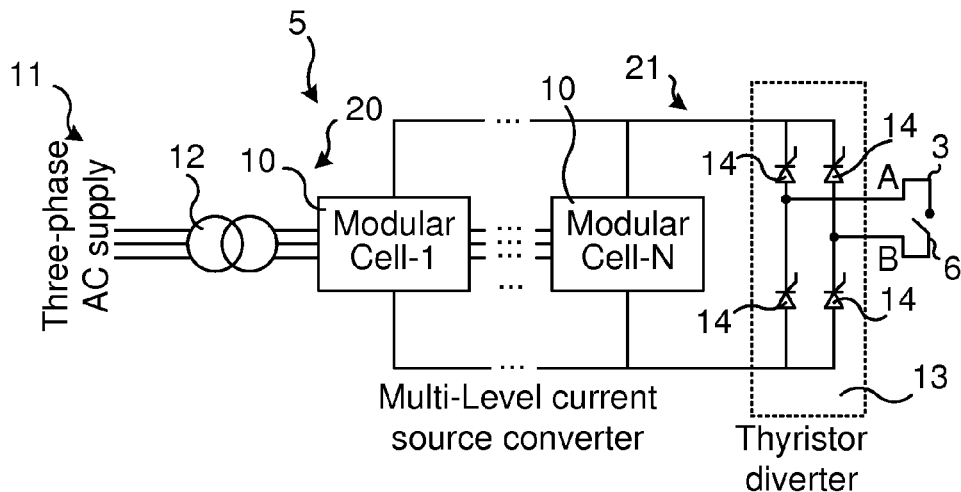
FIG. 5 is a schematic block diagram of an embodiment of a CSC in accordance with the present invention.

FIG. 5 is a schematic block diagram of an embodiment of a CSC 5 in accordance with the present invention. The CSC is at its AC side 20 connected to a three-phase supply 11 via a series converter transformer 12. At its DC side 21, the CSC 5 is connected in series with the transmission line 3 at A and B (which are the same points A and B as in FIG. 4 above and the further figures discussed below), in this embodiment via a thyristor diverter 13. The thyristor diverter comprises a plurality of thyristor switches 14, typically at four switch positions. The thyristor diverter will be further discussed below with reference to FIG. 7. The thyristor diverter is realized by an H-Bridge converter made of thyristors. The thyristor diverter is used to make the topology work in all four quadrants. The thyrister diverter will be further discussed below with reference to FIG. 7. The CSC 5 comprises a plurality of modular CSC cells 10 connected in parallel with each other. As mentioned above, by using a plurality of parallel CSC cells 10, the current waveshape is improved with reduced or, no need for filters, and components with a lower rating can be used which may reduce the cost of the CSC 5.

Figure 6:
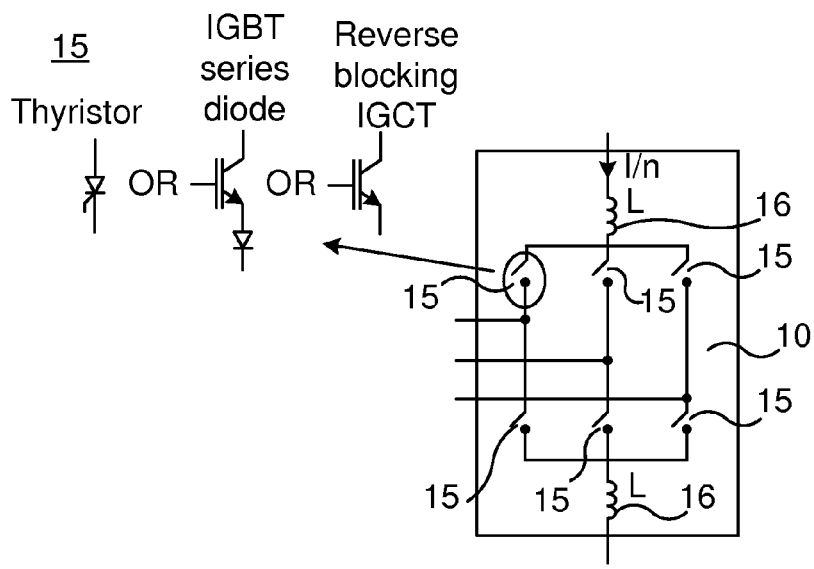
FIG. 6 is a schematic block diagram of an embodiment of a modular CSC cell in accordance with the present invention.

FIG. 6 is a schematic block diagram of an embodiment of a modular CSC cell 10 in accordance with the present invention. The internal structure of the CSC cell 10 of FIG. 5 is here given. The cell 10 is configured for three-phase AC and comprises two switch positions per phase, one to each side of the connection with the phase. Thus, the cell comprises six switch positions, each comprising at least one switch 15. As is illustrated in the figure, there are different possible designs of any of the switches 15. For instance switch 15 may comprise a forced commutated thyristor, an insulated-gate bipolar transistor (IGBT) in series with a diode, and/or a reverse Mocking integrated gate-commutated thyristor (IGCT). Thyristors naturally give voltage blocking of two directions and current conduction in a single direction. If an IGBT is used, it must be in series with a diode as shown in FIG. 6 to ensure voltage blocking in both directions. A reverse blocking IGCT can also be sought out as an option for the switch realization. There is also in each CSC cell 10 a reactor 16, positioned upstream of the switches 15, and a reactor 16 positioned downstream of the switches 15, in relation to the DC current stream from the transmission line 3.

FIGS. 5 and 6 shows the modular nature of the multi-level current source converter 5. Multiple cells 10 of similar nature can be connected in parallel depending on the number of current levels required at the AC side 20, such that the filter requirement on the AC side is reduced. The reactors 16 present in each cell can be designed to limit the current ripple within the cell in the required limits. Since the converter 5 is series connected with the HVDC line 3, the topology reduces the filter requirement on both the DC and the AC sides 20 and 21. Moreover, the reactors 16 present in each CSC cell 10 can be designed to limit the current ripple within required limits, thus reducing or eliminating the need of an additional external DC filter as well.

Since a multilevel current source converter 5 is used, the number of current levels in the AC side 20 is equal to (2*N+1), where N is the number of modular cells 10. The switching frequency of the current at the AC terminals is also equal to $N*f_{CELL}$, where $f_{CELL}$ is the device switching frequency of each modular cell 10. Because of the multilevel nature of the AC output current waveform, the filtering requirement here is drastically reduced. For N number of cells and a DC current I flowing in the HVDC line 3, the current in each semiconductor switch 15 and the balancing reactors 16 is I/N. Thus, the reactors may be designed for lower current rating (N times lower). Also, the semiconductor area required (i.e. for the switches) per leg in a CSC cell 10 is reduced by N times, which can allow the usage of industrially available semiconductor switches 15. The voltage blocking required by the semiconductor switches is peak of the line-line voltage of the connected three-phase AC. The switches 15 would require a higher voltage rating but a lower current rating (depending on the number of levels). Industrial IGBT modules or reverse Mocking IGCTs are suitable for this purpose. Forced commutated thyristor based devices can also be used in the CSC 5 since the device switching frequency is low. Optimizations in the Pulsewidth modulation (PWM) such as selective harmonic elimination PWM can further to reduce the losses and the associated cost of the overall topology.

Figure 7:
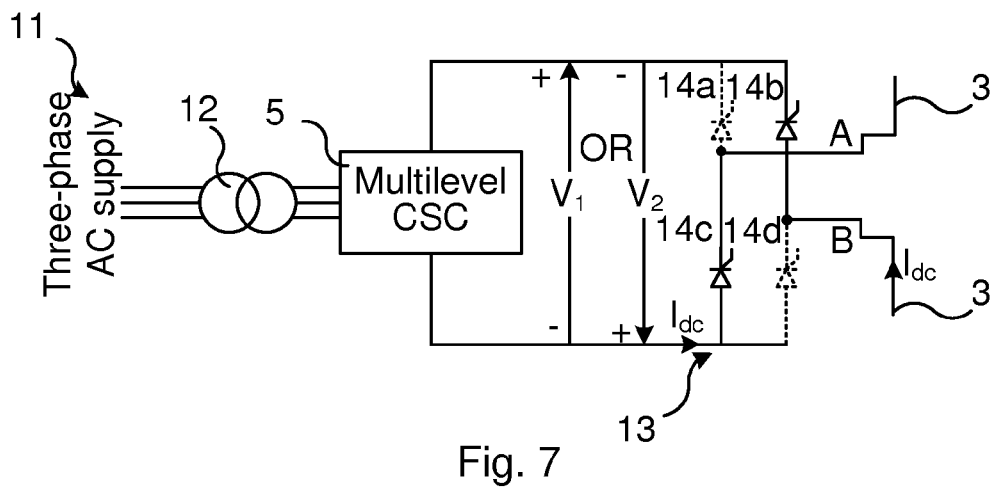
FIG. 7 is a schematic block diagram of another embodiment of a CSC, comprising a thyristor diverter, in accordance with the present invention.

FIG. 7 is a schematic block diagram of another embodiment of a CSC 5, comprising a thyristor diverter 13, in accordance with the present invention. This figure is used to discuss the thyristor diverter 13, comprising four thyristor switches 14. For the other parts of the CSC 5, reference is made to FIG. 5. The thyristor diverter 13 switches when the HVDC line 3 current changes direction. Consider an example situation shown in FIG. 7 where $I_{dc}$ is the line current direction as illustrated with the arrow along the transmission line 3. The thyristors presently conducting are 14b and 14c (indicated in bold in FIG. 7). During a line current reversal, $I_{dc}$ comes down to zero and then increases in the reverse direction. At the zero crossing of $I_{dc}$, thyristors 14b and 14c stop conducting (since the current through them goes below the holding value). Also, thyristors 14a and 14d are given a gating signal. Now, as the current increases in the reverse direction, the current naturally passes through thyristors 14a and 14d. This occurs irrespective of the voltage injected by the converter 5. Hence, it can be seen that the thyristors 14 allow a seamless line current change without any force commutation requirement.

Example 1

Bi-Directional Current Conducting Switches

Figure 8:
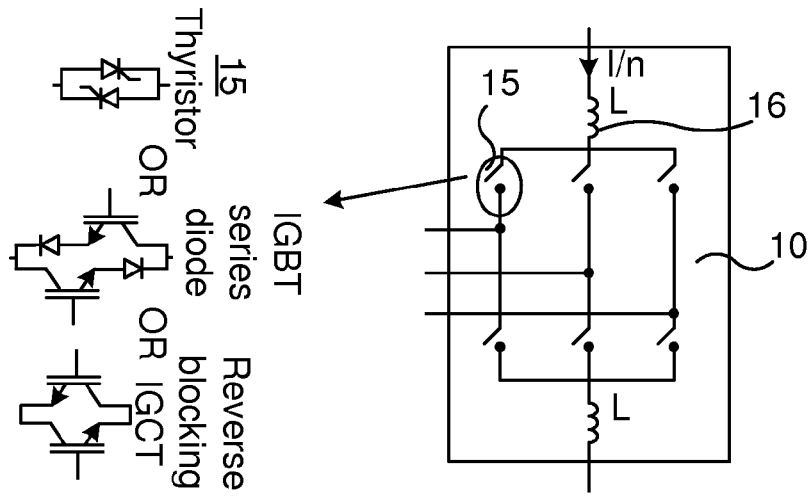
FIG. 8 is a schematic block diagram of another embodiment of a modular CSC cell in accordance with the present invention.

There are other ways of achieving operation in all four quadrants, instead of using a thyristor diverter 13. For instance, four quadrant switches 15 may be used in the CSC cells to, then it is possible to have a four quadrant operation without the need of a thyristor diverter 13. FIG. 8 is a schematic Nock diagram of another embodiment of a modular CSC cell to in accordance with the present invention, in which bi-directional current conducting switches 15 are used. Two-way (i.e. bi-directional current conducting) variants of the switches 15 are shown in FIG. 8 for the three variants discussed with reference to FIG. 6: a forced commutated thyristor, an insulated-gate bipolar transistor (IGBT) in series with a diode, and/or a reverse Mocking integrated gate-commutated thyristor (IGCT), all with bi-directional voltage blocking and bi-directional current conducting properties. However, in spite to of the absence of the thyristor diverter 13, the semiconductor requirement of the CSC 5 doubles if this embodiment is used, which increases the cost.

Example 2

Antiparallel CSC

Figure 9:
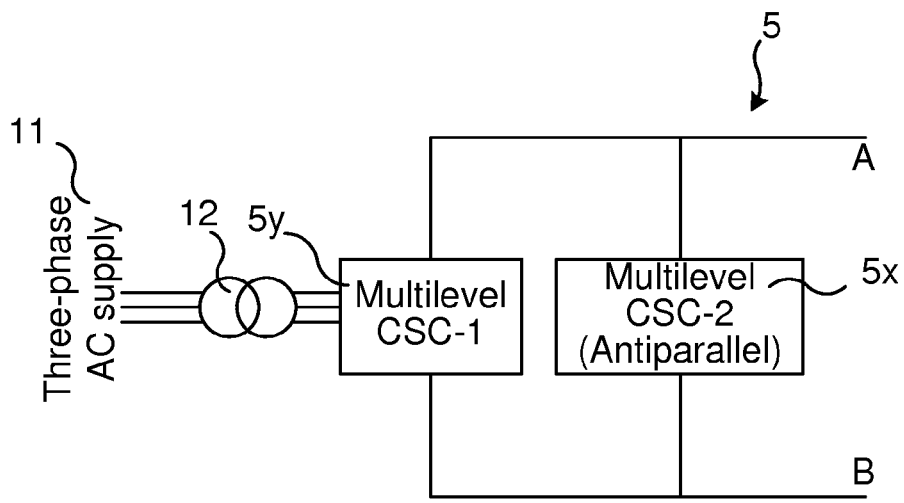
FIG. 9 is a schematic block diagram of another embodiment of a CSC, comprising an anti-parallel CSC part, in accordance with the present invention.

FIG. 9 is a schematic block diagram of another embodiment of a CSC 5, comprising an anti-parallel CSC part 5x, in accordance with the present invention. This is another alternative to a thyristor diverter 13 to achieve bi-directional current conduction of the CSC 5. An extra antiparallel multilevel CSC part 5x of the CSC 5 is used, which is configured for current conduction in a direction opposite to the direction of CSC part 5y of the CSC 5 is configured to conduct in, to obtain four-quadrant operation. However, in spite of the absence of the thyristor diverter 13, the semiconductor requirement of the CSC 5 doubles also if this embodiment is used, which increases the cost.

Example 3

Fault Protection

Another important advantage is its performance at fault conditions at the HVDC line 3. Current (prior art) topologies, being voltage source in nature, are more vulnerable to HVDC line side faults (pole-ground or, pole-to-pole fault).

To protect the series converter, additional reactors (cf. reactors 18 in FIG. 10) are connected in the HVDC line 3, rated at full line current. These reactors 18 will limit the cable discharge current through the series converter for cable based system and also the rate of rise of current during the fault condition.

The requirement of a fast bypass switch increases the cost of the overall topology. The requirement of additional inductors designed to carry rated current also increases the overall cost significantly.

Figure 10:
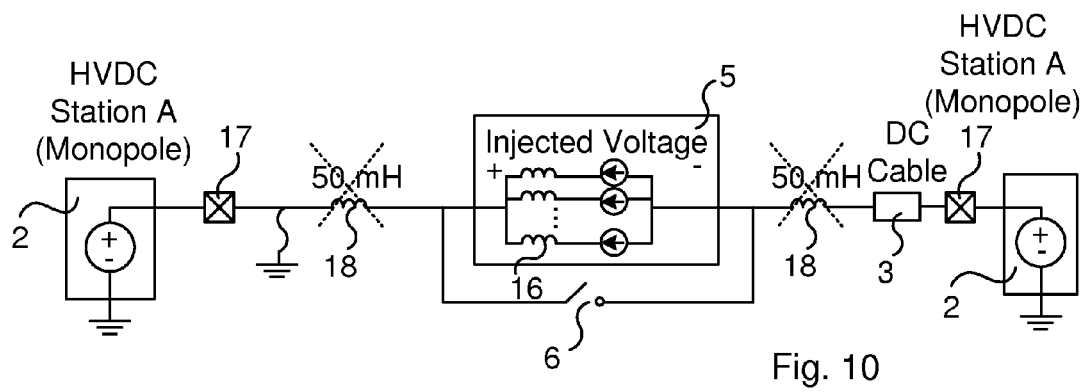
FIG. 10 is a schematic block diagram of another embodiment of an HVDC power transmission line, with a series CSC in accordance with the present invention.

The same fault case with the CSC 5 of the present invention being used is presented in FIG. 10. Additional reactors 18 rated at the HVDC line current will not be required in this case, as indicated by the reactors 18 being crossed over in FIG. 10. The current sharing reactors 16 in the multilevel current to source converter cells to will ensure that the cable discharge current is limited at the event of a fault.

The presence of current sharing inductors removes the necessity to bypass the series converter 5 immediately after the fault occurrence. This will simplify the protection scheme significantly leading to a reduced cost of the overall CSC.

Example 4

Single Phase AC

Figure 11:
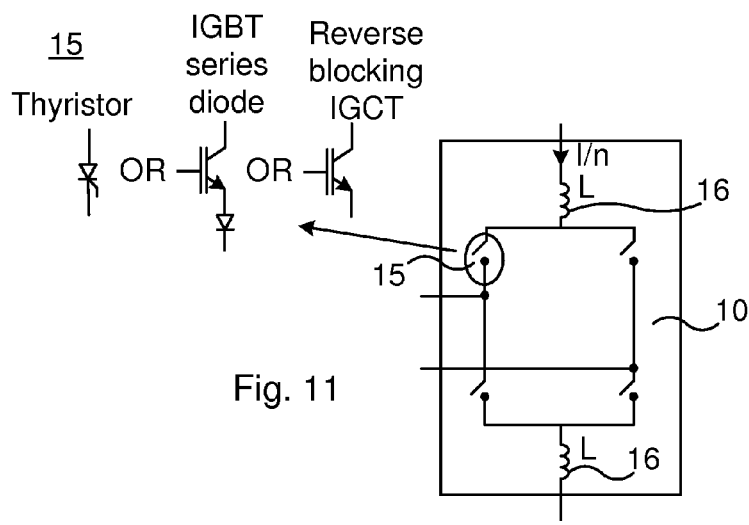
FIG. 11 is a schematic block diagram of another embodiment of a modular CSC cell in accordance with the present invention.

A single phase alternative for the CSC 5 is shown in FIG. 11, showing the internal structure of a CSC cell to in a single phase embodiment. A single phase supply 11 is available in close vicinity of the series converter 5. For the overall topology, reference is made to FIG. 5. As can be seen in FIG. 11, the semiconductor requirement I is substantially reduced. Since it is a current source inverter, the AC current magnitude remains the same, but to transfer the same power as in the three phase case, the single phase voltage will have to increase. This means that the semiconductor switches 15 will need to be rated at a higher Mocking voltage. As shown in FIG. 11, wherein the AC side 20 is configured for input of single phase AC, each modular CSC cell 10 may comprise four switch positions.

Example 5

Alternative Single Phase Topology

Figure 12:
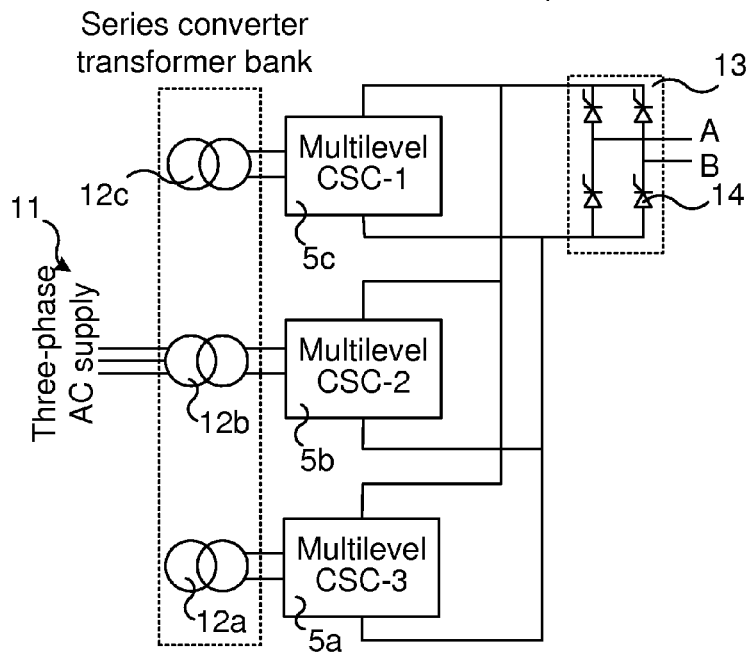
FIG. 12 is a schematic block diagram of another embodiment of a CSC, comprising three single phase CSC parts, in accordance with the present invention.

A problem of the single phase alternative (Example 4) is the unbalance caused in the three-phase AC side 20. One solution to address this issue and to increase the redundancy of the proposed single phase solution is given in FIG. 12. Here, the converter transformer 12 comprises three parts, 12a, 12b and 12C, one for each of three single phase CSC parts 5a, 5b and 5c of the CSC 5, one for each phase of the three phase supply 11. The secondary of the three phase series converter transformer can be a star or a delta configuration. If the neutral point is available, each multilevel CSC part 5a, 5b and 5c (as shown in FIG. 12), is fed by a phase voltage and the neutral. If the neutral point is not available, each multilevel CSC part is fed by the line-line voltages. Apart from addressing the issue of unbalance in the three-phase AC side, this topology variant also provides redundancy of the series converter 5. If one of the multilevel CSC parts is not functioning, the other two multilevel CSC's can provide the required power (provided each converter is appropriately rated). In such a situation unbalance in the three-phase side may exist.

Another possibility is the individual Multilevel CSC parts 5a-c can be connected in series in the DC side 21. This will reduce the voltage ratings of the switches 15 and the series converter transformer 12. The downside here may be the increased current rating, but this can be addressed by increasing the number of parallel cells 10.

Example 6

Method

Figure 13:
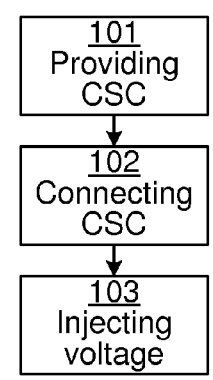
FIG. 13 is a schematic flow chart of an embodiment of a method of the present invention.

FIG. 13 is a schematic flow chart of an embodiment of a method of the present invention. The method is for controlling electrical power transmission in an HVDC transmission line 3 in an HVDC transmission system 1. A CSC 5 is provided 101. The CSC is in accordance with the present invention. Thus, the CSC 5 comprises an AC side 20 for input/output of AC to/from the CSC, a DC side 21 for input/output of DC to/from the CSC, and a plurality of modular CSC cells 10 connected in parallel with each other between the AC side and the DC side of the CSC. Each modular cell comprises a plurality of switches 15. The CSC 5 connected 102 in series with the HVDC transmission line 3. Then a voltage is injected 103 in series with the HVDC transmission line 3. A positive voltage is injected 103 from the CSC 5 in series with the HVDC transmission line 3 in order to reduce current flow in the line. A negative voltage is injected 103 from the CSC 5 in series with the HVDC transmission line 3 in order to increase current flow in the line. Thus, the current in the HVDC transmission line 3 is controlled by injecting a positive or negative voltage in series with the transmission line, as desired. Also, the magnitude of the injected voltage may be adjusted for improved control of the current flow in the line 3.

The reduced cost of semiconductors, fillers, and reduced losses (due to forced commutated thyristor switches and lower switching frequency) will lead to an overall reduction in the cost of the inventive series converter topology. Apart from this, as explained before, since the protection scheme is simplified, the cost for protection and the complexities involved in its implementation will also reduce to a great extent.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A multilevel current source converter, CSC, for controlling electrical power transmission in a high voltage direct current, HVDC, transmission system, the CSC comprising:
   an alternating current, AC, side for input/output of AC to/from the CSC;
   a direct current, DC, side for input/output of DC to/from the CSC;
   a plurality of modular CSC cells connected in parallel with each other between the AC side and the DC side of the CSC, each modular cell comprising a plurality of switches; and
   a thyristor diverter comprising a plurality of thyristors at the DC side of the CSC and connected to the plurality of modular CSC cells,
   wherein the CSC is configured for being connected in series with an HVDC transmission line and for injecting a voltage in series with the HVDC transmission line at the DC side of the CSC, and
   wherein the thyristor is configured to allow the CSC to inject the voltage in series with the HVDC transmission line regardless of the direction in which a current flows in said HVDC transmission line.

2. The CSC of claim 1, wherein the thyristor diverter is an H-bridge converter.

3. The CSC of claim 1, wherein the plurality of switches have bi-directional voltage blocking and unidirectional current conducting properties.

4. The CSC of claim 1, wherein the plurality of switches each comprises a forced commutated thyristor, an insulated-gate bipolar transistor, IGBT, with series diode, a reverse blocking integrated gate-commutated thyristor, IGCT, or a reverse blocking IGBT, RBIGBT.

5. The CSC of claim 1, wherein the AC side is configured for input of three phase AC, and wherein each modular CSC cell comprises six switch positions, two per AC phase.

6. The CSC of claim 1, wherein the AC side is configured for input of single phase AC, and wherein each modular CSC cell comprises four switch positions.

7. The CSC of claim 6, wherein the CSC comprises three CSC parts configured to be connected in parallel or in series with each other, each of the three CSC parts being configured for single phase AC input, to form a CSC with three single phase CSC parts in parallel or series with each other, one for each phase of a three phase AC supply.

8. The CSC of claim 1, wherein each modular CSC cell comprises a reactor upstream of the plurality of switches and a reactor downstream of the plurality of switches.

9. The CSC of claim 2, wherein the plurality of switches have bi-directional voltage blocking and unidirectional current conducting properties.

10. The CSC of claim 2, wherein the plurality of switches each comprises a forced commutated thyristor, an insulated-gate bipolar transistor, IGBT, with series diode, a reverse blocking integrated gate-commutated thyristor, IGCT, or a reverse blocking IGBT, RBIGBT.

11. The CSC of claim 2, wherein the AC side is configured for input of three phase AC, and wherein each modular CSC cell comprises six switch positions, two per AC phase.

12. The CSC of claim 2, wherein the AC side is configured for input of single phase AC, and wherein each modular CSC cell comprises four switch positions.

13. The CSC of claim 2, wherein each modular CSC cell comprises a reactor upstream of the plurality of switches and a reactor downstream of the plurality of switches.

14. The CSC of claim 3, wherein the plurality of switches each comprises a forced commutated thyristor, an insulated-gate bipolar transistor, IGBT, with series diode, a reverse blocking integrated gate-commutated thyristor, IGCT, or a reverse blocking IGBT, RBIGBT.

15. The CSC of claim 3, wherein the AC side is configured for input of three phase AC, and wherein each modular CSC cell comprises six switch positions, two per AC phase.

16. The CSC of claim 3, wherein the AC side is configured for input of single phase AC, and wherein each modular CSC cell comprises four switch positions.

17. The CSC of claim 4, wherein the AC side is configured for input of three phase AC, and wherein each modular CSC cell comprises six switch positions, two per AC phase.

18. The CSC of claim 4, wherein the AC side is configured for input of single phase AC, and wherein each modular CSC cell comprises four switch positions.

19. A high voltage direct current, HVDC, power transmission system comprising at least one HVDC transmission line extending between two AC to DC converter stations, the HVDC power transmission system further comprising a multilevel current source converter, CSC, for controlling electrical power transmission in the HVDC transmission line, the CSC comprising:
   an alternating current, AC, side connected to an AC supply for input/output of AC to/from the CSC;
   a direct current, DC, side connected to the HVDC transmission line for input/output of DC to/from the CSC;
   a plurality of modular CSC cells connected in parallel with each other between the AC side and the DC side of the CSC, each modular cell comprising a plurality of switches; and
   a thyristor diverter comprising a plurality of thyristors at the DC side of the CSC and connected to the plurality of modular CSC cells,
   wherein the CSC is configured for being connected in series with an HVDC transmission line and for injecting a voltage in series with the HVDC transmission line at the DC side of the CSC, and
   wherein the thyristor is configured to allow the CSC to inject the voltage in series with the HVDC transmission line regardless of the direction in which a current flows in said HVDC transmission line.

20. A method for controlling electrical power transmission in a high voltage direct current, HVDC, transmission line in an HVDC transmission system, the method comprising the steps of:
   providing a current source converter, CSC, comprising:
      an alternating current, AC, side for input/output of AC to/from the CSC,
      a direct current, DC, side for input/output of DC to/from the CSC, and a plurality of modular CSC cells connected in parallel with each other between the AC side and the DC side of the CSC, each modular cell comprising a plurality of switches;

connecting the CSC in series with the HVDC transmission line; and injecting a positive voltage from the CSC in series with the HVDC transmission line to reduce current flow in the line, and/or injecting a negative voltage from the CSC in series with the HVDC transmission line to increase current flow in the line, where the voltage is allowed, through the use of a thyristor diverter, to be inject in series with the HVDC transmission line regardless of in which direction a current flows in said HVDC transmission line.

* * * * *